June 25, 1935.  H. HUEBER  2,006,320
MOTOR VEHICLE CONSTRUCTION
Filed Oct. 10, 1932  2 Sheets-Sheet 1
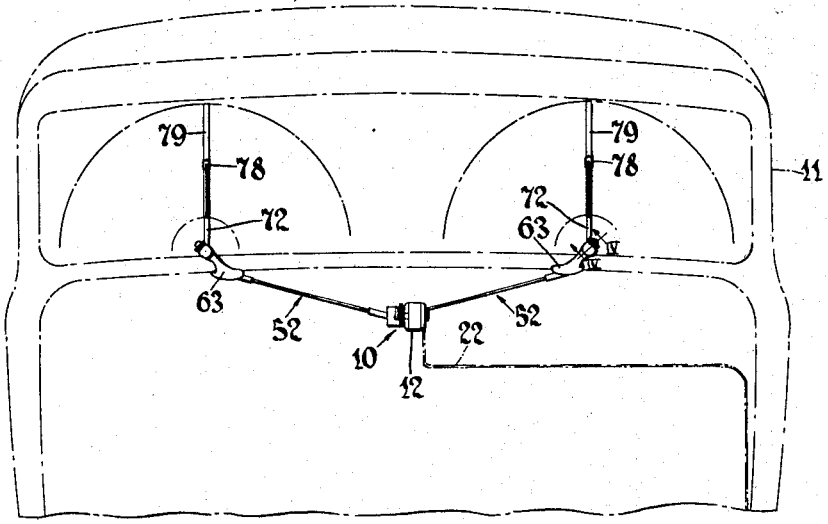
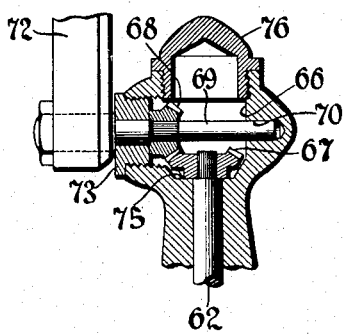
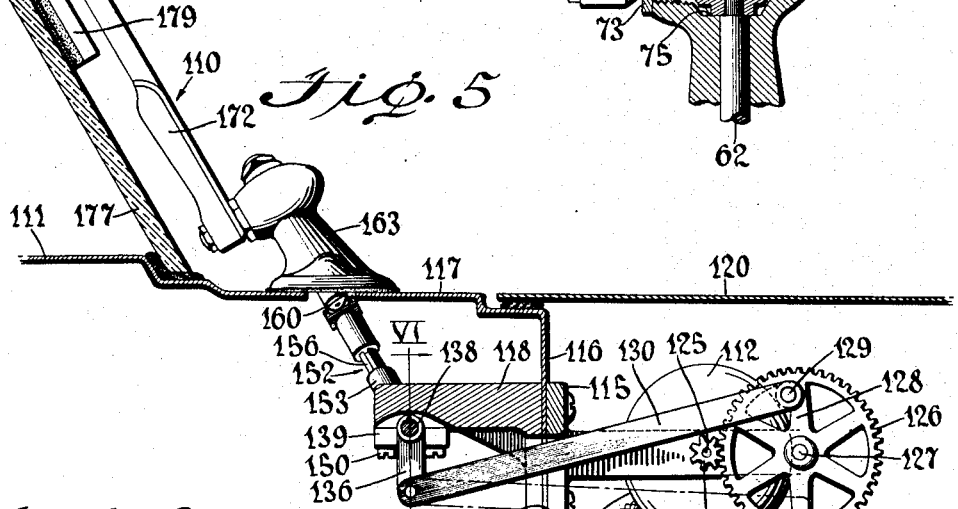
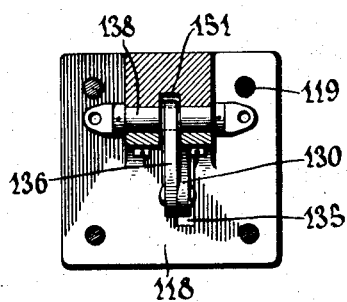
Inventor
Henry Hueber
By Bean & Brooks. Attorneys

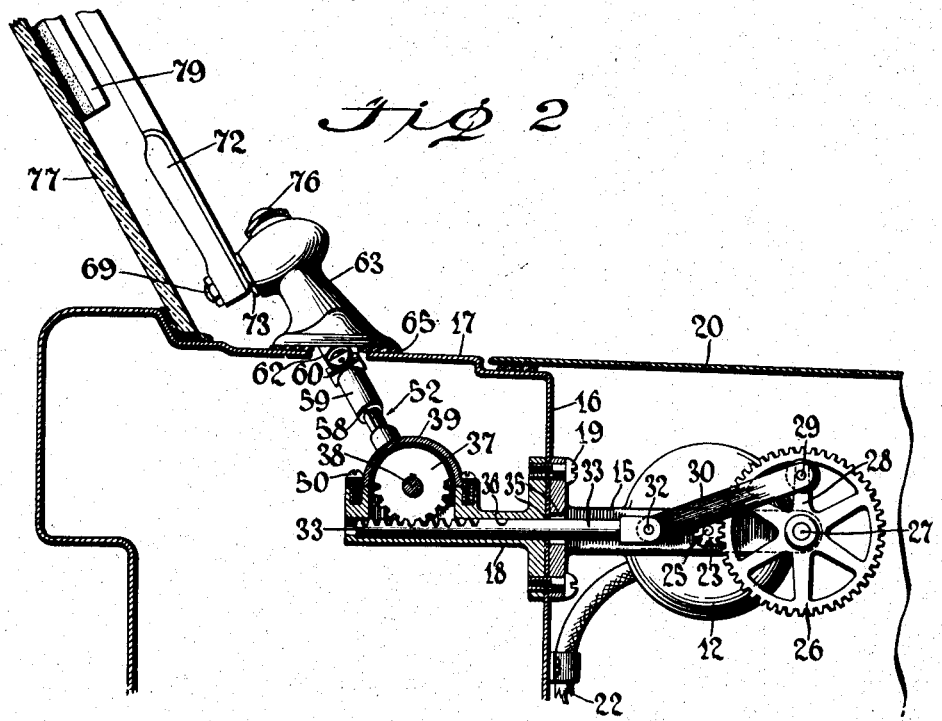
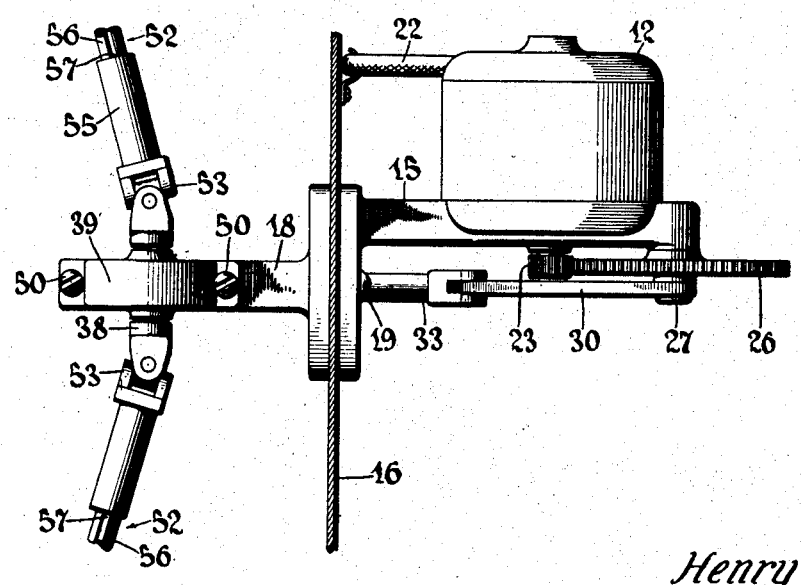

Patented June 25, 1935

2,006,320

UNITED STATES PATENT OFFICE 2,006,320

MOTOR VEHICLE CONSTRUCTION

Henry Hueber, Buffalo, N. Y., assignor to Trico Products Corporation, Buffalo, N. Y.

Application October 10, 1932, Serial No. 637,173

6 Claims. (Cl. 15—255)

This invention relates to the mounting of automatic windshield cleaners upon motor vehicles, and it has particular relation to the association of the windshield cleaner elements relative to the construction of certain parts of the motor vehicle.

One object of the invention is to correlate the construction of a windshield cleaner and the elements on an automotive vehicle in such manner that the cleaner motor may be mounted in a position offset from the location of the wiper blade mounting of the cleaner and without respect to the alignment of the motor and blade elements of the cleaner.

Another object of the invention is to provide a construction in which the windshield cleaner is incorporated beneath the hood of an automobile and operating elements of the cleaner are adapted to be actuated by a transmission of power from an electric motor through the cowl of the motor vehicle.

Another object of the invention is to provide a construction for mounting a windshield cleaner upon the cowl on a motor vehicle adjacent the windshield thereof, and to provide flexible shafting for transmitting power to the wiping elements from the cleaner motor whereby the motor may be mounted in an offset or unaligned position relative to the position of the windshield wiper blade.

In the drawings:

Fig. 1 is a fragmentary phantom view of the body of a motor vehicle and an elevation of a windshield cleaning device mounted thereon.

Fig. 2 is a fragmentary cross section of portions of a vehicle body, and a windshield cleaning device mounted thereon is shown partially in elevation and partially in section.

Fig. 3 is a fragmentary plan of portions of a windshield cleaning device.

Fig. 4 is a fragmentary cross section, on a larger scale, taken substantially along the line IV—IV of Fig. 1.

Fig. 5 is a cross section similar to Fig. 2 and illustrating another form of the invention.

Fig. 6 is a cross section taken substantially along the line VI—VI of Fig. 5.

Referring to Figs. 1, 2 and 3, a windshield cleaning device 10 is mounted upon a vehicle 11 and comprises an electric motor 12 supported upon a bracket 15 that is rigidly secured upon one side of an inwardly disposed flange 16 of a vehicle cowl 17. A bearing bracket 18 is mounted in opposed relation to the bracket 15 on the opposite side of the flange 16. Suitable connections 19 extending through the brackets and flange 16 insure rigid assembly of these elements. The motor is located beneath the vehicle hood 20 and is supplied with electrical energy through a conductor 22 communicating with a suitable electrical battery or generator (not shown) of the vehicle.

A driving pinion 23 rigid with a drive shaft 25 of the motor meshes with a relatively large reduction gear 26 that has a journal connection 27 to the supporting bracket 15. One of the spokes 28 of the gear serves as a crank arm which has a pivotal connection 29 to one end of a pitman 30. The other end of the pitman has a pivotal connection 32 to one end of a rack 33 that is reciprocable and extends through openings 35 in the bracket 15 and flange 16 into a bore or guideway 36 of the bearing bracket 18. A segmental gear 37 meshing with the rack 33 has an axial shaft 38 that is rigid therewith and is journalled horizontally in the bracket. A cover 39 is secured by means of suitable connections 50 upon the bracket 18 for properly housing, in conjunction with the bracket, the intermeshing portions of the segmental gear and rack.

Each end of the shaft 38 is connected to a flexible shafting unit 52 including a universal joint 53, one portion of which projects outwardly in the form of a tubular extension 55 that slidably receives a rod 56 having a spline connection 57 guiding it in the tubular extension. A similar spline connection 58 at the opposite end portion of the rod provides for non-rotatable slidable connection of the rod in a tubular extension 59 of a universal joint 60. The flexible shafting units are on opposite sides of the bracket 18 and connected to each end of the shaft 38 to provide for proper transmission of power from the motor for connecting the segmental gear to a cleaner arm operating shaft 62. The inner end of the shaft 62 constitutes a part of the universal connection 60 and the shaft is journalled in a bearing housing 63 that is rigidly mounted upon the cowl 17 of the vehicle. Suitable sound deadening and cushioning material or packing 65 is inserted between the bearing housing and the surface of the cowl.

Each bearing housing 63 is disposed at an incline upon the surface of the cowl, as clearly shown in Figs. 1 and 2, and the shaft extends axially through the housing until its end opposite the universal joint 60 projects into a chamber 66 (Fig. 4) and has a bevel gear 67 rigidly secured thereto. A second bevel gear 68 meshing with the gear 67 is rigidly mounted upon the intermediate portion of a shaft 69 that has one end journalled in a bearing opening 70 of the chamber while its other end supports rigidly a wiper arm 72 of the windshield cleaning device. An intermediate portion of the shaft 69 is supported in a bearing nut 73 threaded into the wall of the chamber 66 and the bevel gear 68 bears against this nut, whereas the other bevel gear 67 bears against an adjacent wall 75 of the chamber. The upper portion of the bearing housing is provided with a removable closure cap 76 threaded into the chamber 66 and permitting access to the chamber for the purpose of inspecting or lubricating the bevel gears.

Each wiper arm 72 extends at an incline substantially parallel to an inclined windshield 77 and has a pivotal connection 78 to a windshield wiper blade 79. From the mean position of the wiper blade, as viewed in Fig. 1, it is adapted to be actuated downwardly in a circular path. After the blade has completed its stroke in either direction, foreign matter, such as moisture, will be in position to fall downwardly away from, rather than into, the cleansed area. Continuous operation of the electric motor reciprocates the rack 33 and hence, causes the oscillation of the blade across the windshield.

In the form of the invention shown in Figs. 5 and 6, a windshield cleaning device 110 is mounted upon a vehicle 111 and is driven by an electric motor 112 mounted upon a supporting bracket 115 that is rigidly secured upon one side of a flange 116 of a vehicle cowl 117 in opposed relation to a bracket 118 secured on the opposite side of the cowl flange. Suitable connections 119 extending through the bracket and flange insure rigid mounting of these parts. Thus, the motor and its operating elements are mounted underneath the vehicle hood 120.

The electric motor 112 carried by the bracket 115 has a pinion 123 on its driving shaft 125 for meshing engagement with a reduction gear 126 that in turn is rotatably mounted on a bearing 127 of the bracket 115. One of the spokes 128 of the gear wheel 126 serves as a crank arm and has a pivotal connection 129 to one end of a pitman 130 and the other end portion of the pitman projects through openings 135 to a position beneath the bracket 118 where it is pivoted to the end of an arm 136 extending rigidly from an intermediate portion of a shaft 138. Bearing sections 139 cooperating with the integral lower portion of the bracket 118 provide a journal support for the shaft 138 and are secured to the bracket by suitable fastening devices 150. The bracket 118 has a recess 151 for receiving the arm 136 at an intermediate portion of the shaft 138.

Each end of this shaft is provided with a flexible shafting unit 152 including universal joints 153 and 160 and rods 156 of the same construction as the flexible shafting unit 52. Likewise, a bearing housing 163, windshield cleaner arm 172, and wiper blade 179 are constructed and mounted in the same manner as the corresponding elements described with reference to Figs. 1 to 4, and hence additional description thereof is not necessary. By operating the motor 112 the arm 136 is oscillated and the oscillatory movement is transmitted through the flexible shafting to the wiper arm 172 for moving the blade across the surface of the vehicle windshield 177.

The cowl and the engine hood really constitute a body portion extending forwardly from the windshield and conjointly serve to house and conceal the windshield cleaner operating mechanism, the drive or power means for such mechanism being preferably disposed on the front of the flange or partitioning wall 16 (116). This wall partitions the engine compartment, beneath the hood, from the passenger compartment or the space beneath the cowl. In practice it is preferred to extend the transmission means from the drive or power means through this partitioning wall into the compartment or space beneath the cowl and thence upwardly through a weather proof opening in the cowl to the wiper actuating arm 172.

By mounting the vehicle windshield cleaning elements in the position shown in the drawings they are accessible for repair or inspection without removing any portion of the vehicle and they may be mounted without marring the streamlining or ornamental characteristics of the motor vehicle.

Although only the preferred forms of the invention have been shown and described in detail, it will be apparent to those skilled in the art that the invention is not so limited but that various changes may be made therein without departing from the spirit of the invention or from the scope of the appended claims.

What is claimed is:

1. In a cowl construction for a motor vehicle having a windshield mounted in conjunction therewith, an inwardly turned flange on the cowl disposed forwardly of the windshield, supporting means on the forward side of the flange of the cowl, a cleaner motor connected to the supporting means, and transmission means extending rearwardly from the motor through the flange and through the cowl to a location adjacent the vehicle windshield for operating a windshield wiper.

2. In a cowl construction for a motor vehicle having a windshield mounted in conjunction therewith, an inwardly turned flange on the cowl disposed forwardly of the windshield, supporting means mounted on the flange to extend on opposite sides thereof with the flange clamped between portions of said means, a cleaner motor mounted on the supporting means on the forward side of the flange, and transmission means extending rearwardly from the motor through the flange and through the cowl to a location adjacent the vehicle windshield for operating the wiper blade, said transmission means including flexible shafting.

3. In a cowl construction for a motor vehicle having a windshield mounted in conjunction therewith, a supporting member carried by and extending inwardly of the cowl construction and forwardly of the windshield, a pair of opposed brackets mounted upon forward and rearward sides of the supporting member with the supporting member clamped therebetween, a motor mounted upon the forward bracket, and power transmission means extending rearwardly from the motor through the supporting member and through the brackets to a location adjacent the vehicle windshield for operating a windshield wiper, a part of said transmission means being carried by the other bracket.

4. In a cowl construction for a motor vehicle having a windshield mounted above and in conjunction therewith, an inwardly turned flange formed on the cowl construction, a pair of opposed brackets mounted on opposite sides of the flange and supported thereby below the cowl, a motor mounted upon one of the brackets, said brackets and flange having registering openings, and power transmission means including a member reciprocable by the motor through said registering openings and having portions thereof carried by the bracket at the side of the flange opposite the motor, said transmission means also including flexible shafting connected to the reciprocable member and extending through the cowl to a location adjacent the vehicle windshield for operating a windshield wiper.

5. A motor vehicle body construction having a windshield and a forwardly extending body portion, a downwardly extending support carried by the body portion forwardly of the windshield, a rotatable drive shaft disposed beneath said forwardly extending body portion and mounted on the forward side of said support, a wiper oscillatable back and forth over the windshield in an arcuate path, means on said forwardly extending body portion for oscillatably supporting the wiper in advance of the windshield, and transmission means connecting the rotatable drive shaft and extending rearwardly in connected relation to said wiper supporting means and including means for translating the rotary motion of the drive shaft into an oscillatory motion for imparting the oscillatory movement to said wiper, a portion of the transmission means being carried by said support on the rear side thereof opposite the drive shaft.

6. In a cowl construction for a motor vehicle having a windshield mounted in conjunction therewith, a wall extending inwardly from the cowl and disposed forwardly of the windshield, supporting means on the forward side of the wall, a windshield cleaner drive member connected to the supporting means, and transmission means extending rearwardly from the drive member through the wall and through the cowl to a location adjacent the vehicle windshield for operating the windshield wiper.

HENRY HUEBER.